(12) United States Patent
Hashimoto et al.

(10) Patent No.: US 8,787,980 B2
(45) Date of Patent: Jul. 22, 2014

(54) GLASS SUBSTRATE OF COVER GLASS FOR PORTABLE ELECTRONIC DEVICE, IMAGE DISPLAY UNIT FOR PORTABLE ELECTRONIC DEVICE, PORTABLE ELECTRONIC DEVICE AND METHOD OF MANUFACTURING GLASS SUBSTRATE OF COVER GLASS FOR PORTABLE ELECTRONIC DEVICE

(75) Inventors: Kazuaki Hashimoto, Akiruno (JP); Tomoyuki Goto, Ome (JP); Mitsugu Imai, Yamanashi (JP); Tetsuo Takano, Tachikawa (JP)

(73) Assignee: Hoya Corporation, Tokyo (JP)

( * ) Notice: Subject to any disclaimer, the term of this patent is extended or adjusted under 35 U.S.C. 154(b) by 55 days.

(21) Appl. No.: 13/331,587

(22) Filed: Dec. 20, 2011

(65) Prior Publication Data
US 2012/0329525 A1 Dec. 27, 2012

(30) Foreign Application Priority Data

Dec. 27, 2010 (JP) .................................. 2010-289499
Nov. 14, 2011 (JP) .................................. 2011-248461

(51) Int. Cl.
*B32B 7/02* (2006.01)
(52) U.S. Cl.
USPC ......................................... 455/566; 428/157

(58) Field of Classification Search
USPC .................................... 455/566; 428/157, 428
See application file for complete search history.

(56) References Cited

U.S. PATENT DOCUMENTS

2009/0197088 A1   8/2009   Murata
2011/0003619 A1   1/2011   Fujii

FOREIGN PATENT DOCUMENTS

| JP | 63-248730 A | 10/1988 |
| JP | 2004-083378 A | 3/2004 |
| JP | 2007-99557 A | 4/2007 |
| JP | 2008-247732 A | 10/2008 |
| JP | 2011-164508 A | 8/2011 |
| WO | 2009/019965 A1 | 2/2009 |
| WO | WO 2009/078406 | 6/2009 |

OTHER PUBLICATIONS

Japanese Office Action of corresponding Japanese Patent Application No. 2011-248461, dated on Jan. 15, 2013.

*Primary Examiner* — Sam Bhattacharya
(74) *Attorney, Agent, or Firm* — Global IP Counselors, LLP

(57) ABSTRACT

The present invention provides a glass substrate of a cover glass for a portable electronic device. The glass substrate includes a front face, a back face and an edge face. The edge face is at least partially formed by means of an etching treatment. A compressive stress layer, formed by means of an ion-exchanging method, is disposed on each of the front and back faces of the glass substrate. The compressive stress layer has the same thickness both in a planar-directional center part thereof and in a planar-directional end part thereof on each of the front and back faces of the glass substrate.

17 Claims, 9 Drawing Sheets

US 8,787,980 B2

GLASS SUBSTRATE OF COVER GLASS FOR PORTABLE ELECTRONIC DEVICE, IMAGE DISPLAY UNIT FOR PORTABLE ELECTRONIC DEVICE, PORTABLE ELECTRONIC DEVICE AND METHOD OF MANUFACTURING GLASS SUBSTRATE OF COVER GLASS FOR PORTABLE ELECTRONIC DEVICE

CROSS-REFERENCE TO RELATED APPLICATION

This application claims priority to Japanese Patent Applications Nos. 2010-289499 on Dec. 27, 2010 and 2011-248461 on Nov. 14, 2011, the entirety of which is hereby incorporated by reference in its entirety.

FIELD

The present invention relates to a glass substrate of a cover glass for a portable electronic device, an image display unit for a portable electronic device, a portable electronic device and a method of manufacturing a glass substrate of a cover glass for a portable electronic device.

BACKGROUND

The portable electronic devices (e.g., mobile phones), embedded with an image display panel (LCD panel, organic EL (Electro-Luminescence) panel, etc.), are generally provided with a cover glass for protecting the image display panel. For example, this type of cover glass for a potable electronic device is fabricated as follows. First, a large-sized plate glass is cut in a predetermined shape for fabricating a small-sized plate glass. Next, the small-sized plate glass is soaked in molten salt for chemical strengthening. Subsequently, a variety of functional layers (e.g., antireflective film) is formed on the surface of the chemically strengthened small-sized plate glass on an as-needed basis (see Japan Laid-open Patent Application Publication No. JP-A-2007-099557, especially paragraphs 0042, 0043, 0056 and 0057). In other words, a chemical strengthening step is executed after a cutting step in the art of the publication No. JP-A-2007-099557. Meanwhile, there has been proposed another art of executing the cutting step by means of etching in executing the cutting step and the chemical strengthening step in the same order as the art of the publication No. JP-A-2007-099557 (see International Patent Application No. WO2009/078406, especially claims).

In the art of the publication No. WO2009/078406, a plate glass is cut by means of wet etching (chemical etching). In addition, a cutting method using dry etching has been known (see Japan Laid-open Patent Application Publication No. JP-A-S63-248730, especially claims and right bottom section of page 3). In the art of the publication No. JP-A-S63-248730, it is also proposed that a variety of functional films are formed on a plate glass and the plate glass with functional films are subsequently cut by means of etching. However, scribe-cutting is generally more widely used than etching as a plate glass cutting method. It should be herein noted that the following drawbacks have been pointed out for executing scribe-cutting with respect to a tempered glass or a chemically strengthened glass (see Japan Laid-open Patent Application Publication No. JP-A-2004-83378, especially claim 1, paragraph 0007, and Description of Preferred Embodiments). The tempered glass is broken into pieces when being scribe-cut. On the other hand, the chemically strengthened glass cannot be divided along scribe-lines. Also, glass substrates, obtained by scribe-cutting of the chemically strengthened glass, can be broken with a load smaller than an estimated withstand load. To appropriately cut a chemically strengthened glass along scribe-lines, the art of the publication No. JP-A-2004-83378 proposes a chemically strengthened glass with the following configuration. The chemically strengthened glass includes a compressive stress layer with a thickness in a range of 10 to 30 μm for withstanding against a compressive stress in a range of 30 to 60 kgf/mm$^2$.

Except for the aforementioned arts, the following art has been known as an exemplary conventional art of the present invention (see Japan Laid-open Patent Application Publication No. JP-A-2008-247732, especially claims). In the art, a large-sized chemically strengthened glass is cut by means of physical cutting such as laser cutting or scribe-cleaving.

A glass is cut by means of a scribing or etching treatment, and an ion-exchanging treatment is executed in manufacturing a chemically strengthened plate rectangular glass product (i.e., glass substrate) with at least a functional layer disposed thereon on an as-needed basis as exemplified in the publication No. JP-A-2007-99557, the application No. WO2009/078406 and so forth. Therefore, the glass substrate is ion-exchanged from the front-face side, the back-face side and the edge sides. Specifically, a compressive stress layer is formed on each corner part of the glass substrate by means of the ion-exchanging treatment from three directions (i.e., the front-face/back-face side and two edge sides). Therefore, the compressive stress layer on each corner part of the glass substrate has a thickness much greater than that of the compressive stress layer on the other part of the glass substrate. Accordingly, strain (stress) tends to be concentrated on the compressive stress layer on each corner part of the glass substrate. In other words, each corner part is inferior to the other part from the perspective of impact resistance.

In view of the above, the present invention has been produced. It is an object of the present invention to provide a glass substrate, including corner parts with good impact resistance, of a cover glass for a portable electronic device, an image display unit for a portable electronic device using the glass substrate, a portable electronic device using the substrate, and a method of manufacturing a glass substrate of a cover glass for a portable electronic device.

SUMMARY OF THE INVENTION

The aforementioned problems/drawbacks will be solved by the present invention to be described.

A glass substrate of a cover glass for a portable electronic device according to a first aspect of the present invention includes a front face, a back face and an edge face at least partially formed by means of an etching treatment. In the glass substrate, a compressive stress layer formed by means of an ion-exchanging method is disposed on each of the front and back faces while having the same thickness both in a planar-directional center part thereof and in a planar-directional end part thereof on each of the front and back faces.

In the glass substrate of a cover glass for a portable electronic device according to the first aspect of the present invention, the edge face preferably includes a flat surface formed by means of a polishing treatment on a center region thereof in a thickness direction of the glass substrate.

In the glass substrate of a cover glass for a portable electronic device according to the first aspect of the present invention, the edge face preferably includes: the region having the flat surface formed by means of the polishing treatment; and a region having a curved surface with a surface roughness Ra of less than or equal to 10 nm.

In the glass substrate of a cover glass for a portable electronic device according to the first invention, the edge face is preferably a mirror surface.

In the glass substrate of a cover glass for a portable electronic device according to the first invention, at least one selected from the front and back faces are provided with at least a decoration layer.

In the glass substrate of a cover glass for a portable electronic device according to the first invention, the glass substrate is preferably used for at least one selected from a cover glass for display panel protection and a touch panel.

A glass substrate of a cover glass for a portable electronic device according to a second aspect of the present invention is structured as follows. A compressive stress layer formed by means of an ion-exchanging method is only disposed on each of front and back faces of the glass substrate. Further, an edge face of the glass substrate is a convex curved surface; and the edge face has a surface roughness Ra of less than or equal to 10 nm.

A glass substrate of a cover glass for a portable electronic device according to a third aspect of the present invention is structured as follows. A compressive stress layer formed by means of an ion-exchanging method is only disposed on each of front and back faces of the glass substrate. Further, an edge face of the glass substrate includes a flat surface formed by means of a polishing treatment on a partial region thereof.

An image display unit for a portable electronic device according to another aspect of the present invention includes an image display panel and a cover glass for a portable electronic device. The image display panel includes a rectangular image display area. The cover glass is formed by the glass substrate of a cover glass for a portable electronic device according to one of the first to third aspects of the present invention. The cover glass is disposed on an image display surface side of the image display panel. The cover glass has a planar shape roughly matched with a planar-directional contour of the image display area.

A portable electronic device according to yet another aspect of the present invention includes an image display panel and a cover glass for a portable electronic device. The cover glass is formed by the glass substrate of a cover glass for a portable electronic device according to one of the first to third aspects of the present invention. The cover glass is disposed on an image display surface side of the image display panel.

The portable electronic device according to yet another aspect of the present invention is preferably a mobile phone.

A method of manufacturing a glass substrate of a cover glass for a portable electronic device according to a first method aspect of the present invention includes the steps of: executing an ion-exchanging treatment by causing a plate glass containing at least a type of alkaline metal to make contact with a molten salt containing at least a type of alkaline metal; forming an etching-proof layer at least on one of front and back faces of the ion-exchanged plate glass; patterning at least the etching-proof layer; and cutting the ion-exchanged plate glass into pieces by means of an etching treatment of causing the ion-exchanged plate glass face/faces with the patterned etching-proof layer to make contact with an etchant.

A method of manufacturing a glass substrate of a cover glass for a portable electronic device according to a second method aspect of the present invention includes the steps of: forming an etching-proof layer on at least one of front and back faces of a plate glass containing at least a type of alkaline metal after a step of executing an ion-exchanging treatment by causing the plate glass to make contact with a molten salt containing at least a type of alkaline metal; patterning at least the etching-proof layer; and cutting the ion-exchanged plate glass into pieces by means of an etching treatment of causing the ion-exchanged plate glass face/faces with the patterned etching-proof layer to make contact with an etchant.

An exemplary method of manufacturing a glass substrate of a cover glass for a portable electronic device according to one of the first and second method aspects of the present invention preferably further includes the step of forming at least a decoration later on at least one of the front and back laces of the ion-exchanged plate glass after the step of executing the ion-exchanging treatment and before the step of forming the etching-proof layer.

Another exemplary method of manufacturing a glass substrate of a cover glass for a portable electronic device according to one of the first and second aspects of the present invention preferably further includes the step of polishing at least a part of a cut surface formed as a result of the step of cutting the ion-exchanged plate glass into pieces.

According to the present invention, it is possible to provide a glass substrate, including corner parts with good impact resistance, of a cover glass for a portable electronic device, an image display unit for a portable electronic device using the glass substrate, a portable electronic device using the glass substrate, and a method of manufacturing a glass substrate of a cover glass for a portable electronic device.

BRIEF DESCRIPTION OF THE DRAWINGS

Referring now to the attached drawings which form a part of this original disclosure.

DESCRIPTION OF THE PREFERRED EMBODIMENTS

In the following explanation, a glass substrate of a cover glass for a portable electronic device will be simply referred to as "a glass substrate" on an as-needed basis. Further, an image display unit for a portable electronic device will be simply referred to as "an image display unit" on an as-needed basis. Yet further, a method of manufacturing a glass substrate of a cover glass for a portable electronic device will be simply referred to as "a method of manufacturing a glass substrate".
(Glass Substrate, Image Display Unit and Portable Electronic Device)

In a glass substrate of an exemplary embodiment, a pair of compressive stress layers is formed only on the front and back faces by means of ion exchange, and each edge face is formed as a convex curved surface with a surface roughness Ra of, for instance, less than or equal to 10 nm.

Figure 1:
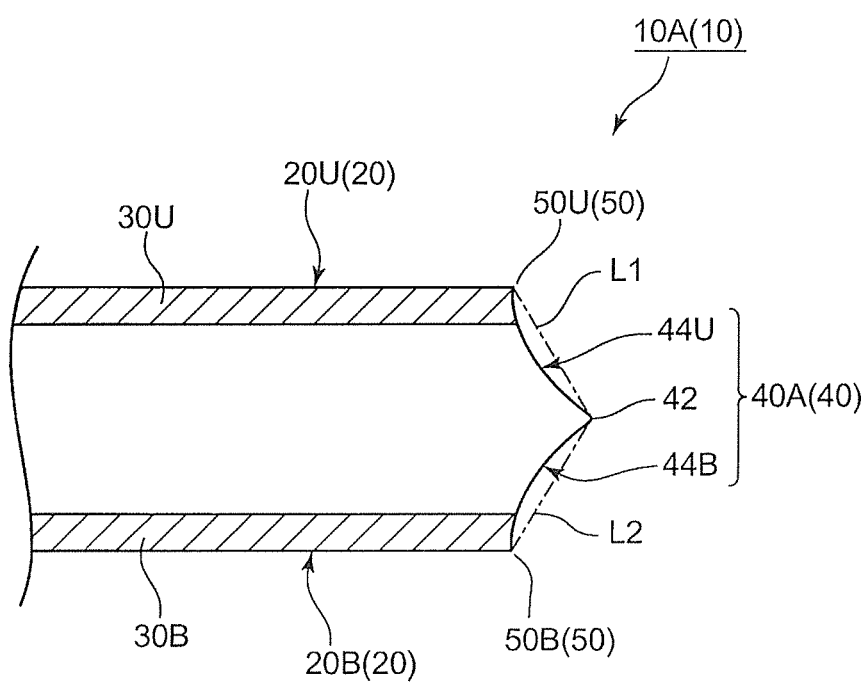
FIG. 1 is a schematic cross-sectional view of an exemplary glass substrate according to an exemplary embodiment of the present invention.

FIG. 1 is a schematic cross-sectional view of an example of a glass substrate according to the present exemplary embodiment. Specifically, FIG. 1 illustrates the cross-section of an edge face and its periphery of the glass substrate. A glass substrate 10A (also collectively referred to as "glass substrate(s) 10" together with the other examples) illustrated in FIG. 1 includes a compressive stress layer 30U on a front face 20U and a compressive stress layer 3013 on a back face 20B. Each compressive stress layer 30U/30B is formed by means of an ion-exchanging treatment and has a constant thickness. Specifically, the compressive stress layers 30U and 30B are formed by causing the front face 20U and the back face 20B to make contact with molten salt.

On the other hand, an edge face 40A (40) is a convex curved surface and has the surface roughness Ra of, for instance, less than or equal to 10 nm. More specifically, the expression "edge face is a convex curved surface" herein means that an edge face of the glass substrate is structured as follows. The edge face includes a ridge and at least a slope. The ridge is extended to the outermost position in the planar direction of the glass substrate. The slope is extended from the ridge to one selected from the principal faces (i.e., the front and back faces) and is formed as a concave curved surface recessed inwards of the glass substrate. Further, curvature of the curved surface is not particularly limited to a specific value as long as the curved surface is an etched surface formed by means of isotropic etching using wet etching from the front-face side and/or the back-face side in fabricating the glass substrate 10A.

In the example illustrated in FIG. 1, a ridge 42 is formed on a roughly center part of the edge face 40A in the thickness direction of the glass substrate 10A. The ridge 42 is protruded to the outermost position in the planar direction of the glass substrate 10A. Further, a gently curved slope 44U is formed from the ridge 42 to the front face 20U, while a gently curved slope 44B is formed from the ridge 42 to the back face 20B. The slopes 44U and 44B are both concave surfaces recessed inwards of the glass substrate 10A. Specifically, the slope 44U is recessed with respect to a theoretical straight line connecting the ridge 42 and an end of the front face 20U (i.e., a straight line L1 depicted with a dotted line in FIG. 1). On the other hand, the slope 44B is recessed with respect to a theoretical straight line connecting the ridge 42 and an end of the back face 20B (i.e., a straight line L2 depicted with a dotted line in FIG. 1). The edge face 40A, having the curved surface shape as described above, is formed by the following steps.

First, the compressive stress layers 30U and 30B are respectively formed on the front and back faces 20U and 20B, and wet etching (as isotropic etching) is then executed for the glass substrate 10A from the front-face 20U side and the back-face 20B side. In other words, the edge face 40A is entirely formed by means of wet etching. The shape of the edge face 40A is not particularly limited to the exemplary shape illustrated in FIG. 1 as long as the edge face 40A has a curved surface formed by means of wet etching and has the surface roughness Ra of less than or equal to 10 nm. For example, the edge face 40A is formed by the slope 44U and the ridge 42 positioned on the back-face 20B side when wet etching is executed for the glass substrate 10A only from the front-face 20U side.

Except for the compressive stress layers 30U and 30B respectively formed on the front and back faces 20U and 20B, no other compressive stress layers are formed on the edge face 40A by means of an ion-exchanging treatment. Therefore, the thickness of the compressive stress layer 30U in a corner part 50U (boundary between the front face 20U and the edge face 40A), which is the thickness of an planar-directional end of the front face 20U, is substantially identical to the thickness of the compressive stress layer 30U on roughly the planar-directional center part of the glass substrate 10A. Likewise, the thickness of the compressive stress layer 30B in a corner part 50B (boundary between the back face 20B and the edge face 40A), which is the thickness of an planar-directional end of the back face 20B, is substantially identical to the thickness of the compressive stress layer 30B on roughly the planar-directional center part of the glass substrate 10A. The structure prevents concentration of strain (stress) on the edges 50U and 50B. It should be noted that each edge 50U/50B illustrated in FIG. 1 is a boundary between the principal face 20 (20U, 20B) and the edge face 40A, i.e., a boundary between two surfaces. However, the thicknesses of each compressive stress layer 30U/30B in a boundary among the principal face 20, the edge face 40A and the other edge face (not illustrated in the figures) intersecting with the edge face 40A, i.e., in a corner part formed as a boundary among three surfaces, is substantially the same as the thickness of each compressive stress layer 30U/30B on roughly the planar-directional center part of the glass substrate 10A. The structure also prevents concentration of strain (stress) on the corner part formed as the boundary among three surfaces (also referred to as "three-surface corner part") as well as on the corner part formed as the boundary between two surfaces (also referred to as "two-surface corner part"). Consequently, degradation in impact resistance due to strain (stress) concentration is not caused in any corner parts. It should be noted that the three-surface corner part corresponds to eight apexes of a cube.

Figure 2:
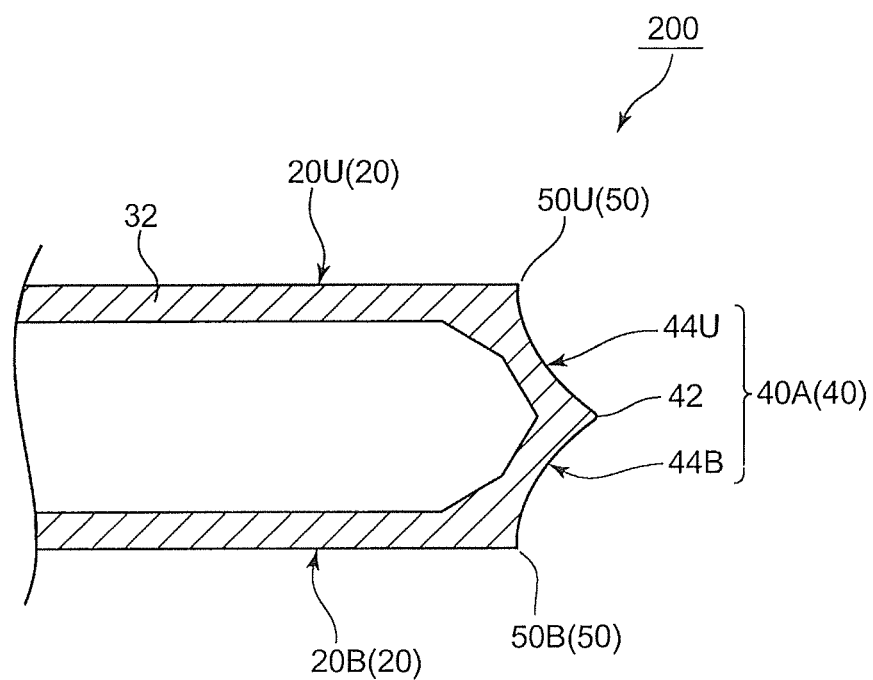
FIG. 2 is a diagram for a first comparative example illustrating a schematic cross-sectional view of an example of a glass substrate fabricated by ion-exchanging the entire surface of a plate glass cut in a predetermined shape.
Figure 3:
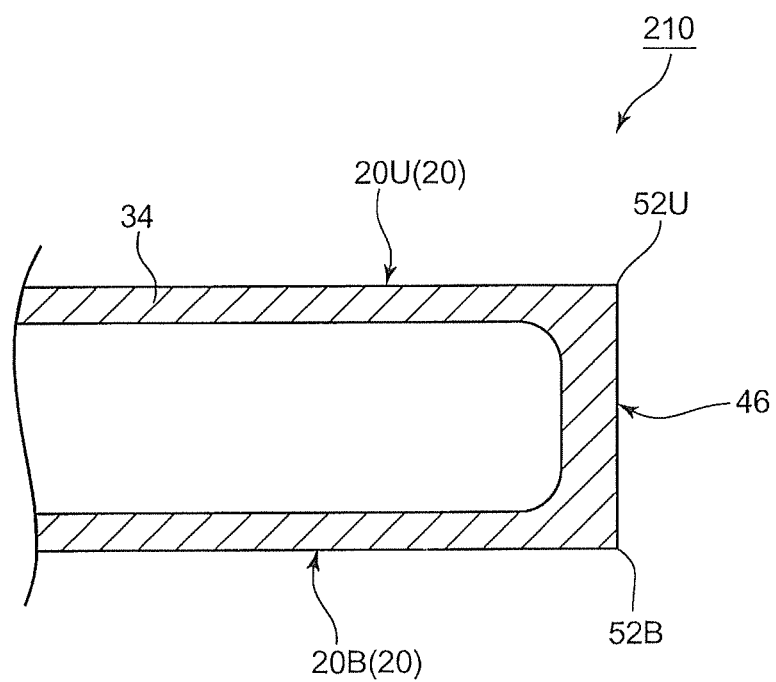
FIG. 3 is diagram for a second comparative example illustrating a schematic cross-sectional view of another example of the glass substrate fabricated by ion-exchanging the entire surface of a plate glass cut in a predetermined shape.

On the other hand, it is also possible to produce a glass substrate having a structure similar to that of the glass substrate 10A illustrated in FIG. 1 by ion-exchanging either a plate glass with a cross-sectional shape similar to that of the glass substrate 10A (i.e., a pre-ion-exchanged glass) or a small-sized plate glass obtained by scribe-cutting a large-sized plate glass (i.e., a pre-ion-exchanged glass). FIGS. 2 and 3 are diagrams according to first and second comparative examples, and each diagram illustrates a schematic cross-sectional view of an exemplary glass substrate fabricated by executing an ion-exchanging treatment for the entire surface of a glass substrate cut in a predetermined shape. Specifically, the glass substrate illustrated in FIG. 2 is fabricated using a plate glass cut by means of wet etching similarly to the glass substrate 10A illustrated in FIG. 1. On the other hand, the glass substrate illustrated in FIG. 3 is fabricated using a plate glass obtained by means of scribe-cutting. In FIGS. 2 and 3, the same reference numerals are assigned to the components having the same shapes as the corresponding components in FIG. 1.

In FIG. 2, a glass substrate 200 includes a compressive stress layer 32 continued from principal faces 20 (front face 20U, back face 20B) to an edge face 40A. In FIG. 3, a glass substrate 210 includes a compressive stress layer 34 continued from principal faces 20 (front face 20U, back face 20B) to an edge face 46. It should be noted that the edge face 46 illustrated in FIG. 3 is a flat surface formed by means of scribe-cutting. In fabricating the glass substrate 200, ion exchange is configured to be executed with respect to each corner part 50U/50B and its periphery through two surfaces, i.e., the principal face 20 (20U/20B) and the edge face 40A. This is also true to ion exchange to be executed with respect to each corner part 52U/50B (boundary between the front/back face 20U/20B and the edge face 46) and its periphery in fabricating the glass substrate 210. Therefore, the compressive stress layer 32 has a greater thickness in each corner part 50U/50B and its periphery than in the other position. Likewise, the compressive stress layer 34 has a greater thickness in each corner part 52U/52B and its periphery than in the other position. In other words, strain (stress) tends to be concentrated on these corner pats and their peripheries. Also, increase in thickness of the compressive stress layer and strain (stress) concentration are remarkable in a three-surface corner part to be ion-exchanged from three surface sides. Put the above together, regarding impact resistance in the corner parts (especially in the three-surface corner parts), the glass substrate 10 of the present exemplary embodiment illustrated in FIG. 1 is much superior to the glass substrates 200 and 210 of the first and second comparative examples illustrated in FIGS. 2 and 3.

When a micro crack is produced on the glass surface, on the other hand, stress tends to be concentrated about the micro crack and the stress concentration easily breaks the glass. By contrast, such a micro crack is removed from a cut surface formed by means of wet etching using chemical reactions. Accordingly, stress concentration about a micro crack is not easily caused. In the case of machining such as scribe-cutting, however, a cut surface is formed by applying external physical force to a target work. Therefore, a micro crack is inevitably produced on a cut surface. In view of the above, it can be concluded that the glass substrate 10A of the present exemplary embodiment illustrated in FIG. 1 is superior in impact resistance of edge faces to the glass substrate 210 of the second comparative example illustrated in FIG. 3.

The edge face 40A of the glass substrate 200 is herein preferably a mirror surface from a mechanical strength aspect and a visual aspect. The mirror surface herein refers to a surface finished enough to reflect an object just like a mirror, as opposed to a pearskin-like surface having tremendous minute convexo-convexes. For example, a surface may be defined as a mirror surface where a surface roughness thereof in two directions perpendicular to each other on a given plane (i.e., arithmetic mean roughness Ra) is less than or equal to 0.1 µm.

It should be noted that the surface roughness Ra (arithmetic mean roughness) of the edge face 40A is herein required to be less than or equal to 10 nm but is preferably less than or equal to 5 nm. Further, the lower limit of the surface roughness Ra is not herein particularly limited but is set to be greater than or equal to 0.1 nm for practical purposes. The surface roughness Ra of less than or equal to 10 nm can be easily realized by means of wet etching executed in forming the edge face 40A. Further, the surface roughness Ra can be measured by an AFM (Atomic Force Microscope).

Further, the thickness of the compressive stress layers 30U and 30B is arbitrarily set in accordance with applications of the glass substrate. However, the thickness is preferably greater than or equal to 10 µm, more preferably, greater than or equal to 30 µm, and much preferably, greater than or equal to 40 µm for reliably achieving scratch resistance of the principal surfaces 20 and impact resistance of the glass substrate 10A. On the other hand, the upper limit of the thickness of the compressive stress layers 30U and 30B is not particularly limited. However, the thickness is preferably less than or equal to 100 µm, and more preferably, less than or equal to 70 µm for practical purposes of, for instance, preventing increase in time required for an ion-exchanging treatment and preventing spontaneous crash (self destruction) of the glass substrate 10A during manufacturing process due to degradation in balance between stresses applied to the front face 20U and the back face 20B in a cutting step by means of wet etching. Further, the thickness of the compressive stress layer 30U may be different from that of the compressive stress layer 30B. In this case, however, balance is lost between the stresses applied on the front and back faces of the glass substrate 10. The glass substrate 10A will be thereby easily bent. Therefore, the thickness of the compressive stress layer 30U is preferably roughly the same as that of the compressive stress layer 30B.

The thickness of the glass substrate 10A is not particularly limited. However, the thickness is normally preferably less than or equal to 1 mm, and more preferably, less than or equal to 0.7 mm, for inhibiting weight increase of a variety of machines using the glass substrate 10A and reducing the thicknesses of such machines. It should be noted that the lower limit of the thickness is preferably greater than or equal to 0.2 mm for reliably achieving mechanical strength of the glass substrate 10A.

Figure 4:
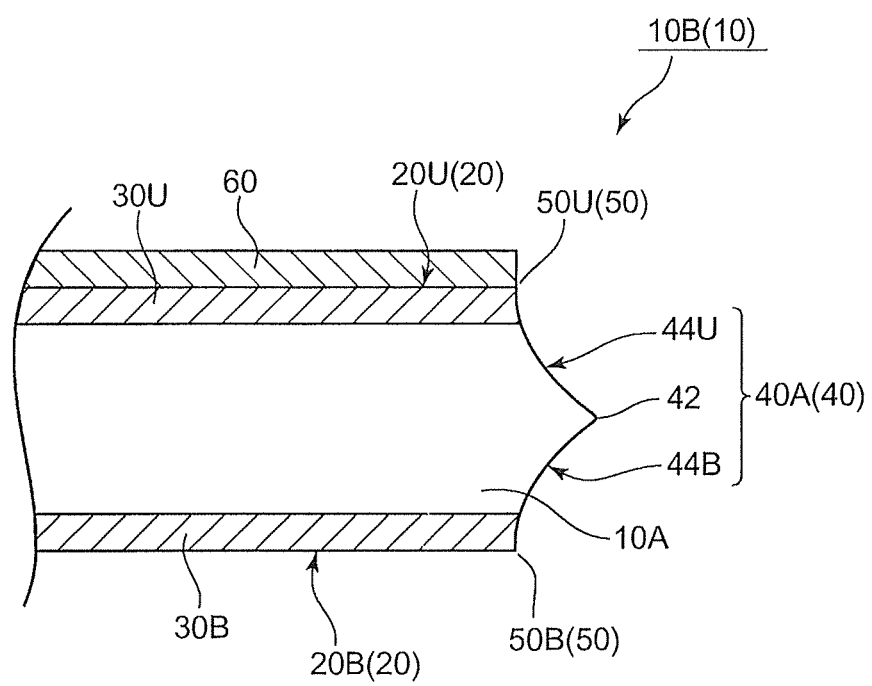
FIG. 4 is a schematic cross-sectional view of yet another example (first example) of the glass substrate according to the exemplary embodiment of the present invention.

It should be noted that the glass substrate 10 of the present exemplary embodiment may be formed only by the glass substrate 10A as the main body illustrated in FIG. 1. However, the glass substrate 10 may be formed as a film-coated glass substrate, that is, a type of glass substrate including at least a decoration layer on at least one selected from the front and back faces 20U and 20B in accordance with applications of the glass substrate 10. FIG. 4 is a schematic cross-sectional view of another example (first example) of the glass substrate according to the present exemplary embodiment. Specifically, FIG. 4 illustrates a glass substrate structure formed by disposing at least a decoration layer on the front face 20U of the glass substrate 10A illustrated in FIG. 1. A glass substrate 10B illustrated in FIG. 4 includes a decoration layer 60 on the front face 20U of the glass substrate 10A as the main body. Examples of the decoration layer 60 include: (1) a layer with an optical function such as an AR (Anti-Reflection) coating, an anti-glare coating, a half mirror coating or a polarizing film; (2) a layer with an electric function such as a transparent electrode film represented by an ITO (Indium Tin Oxide) film; and (3) a layer with a function of enhancing an aesthetic aspect such as a printed layer. Alternatively, a variety of devices such as a touch panel may be formed on the glass substrate 10A as the main body by laminating a plurality of decoration layers 60 and executing a variety of steps such as patterning.

Further, the glass substrate 10 of the present exemplary embodiment may be a type of the glass substrate formed by polishing at least a region of the edge face 40A formed as a convex curved surface of the glass substrate 10A exemplified in FIG. 10 and thereby forming the region as a flat surface. The polished edge face includes only an entirely flat surface formed by means of a polishing treatment. Alternatively, the polished edge face may include a region of a flat surface formed by means of a polishing treatment and a region of a curved surface with the surface roughness Ra of less than or equal to 10 nm. Further, the region of a flat surface formed by means of a polishing treatment is preferably formed by removing at least the ridge 42 and its periphery by means of a polishing treatment. Yet further, the flat surface formed by means of the polishing treatment is preferably arranged roughly perpendicular to the front and back faces 20U and 20B. In this case, for instance, the center region of the edge face 40A in the thickness direction of the glass substrate 10A corresponds to the region of a flat surface formed by means of the polishing treatment. Thus, the polished edge face does not include any remarkably protruded portion originated from the ridge 42. Therefore, flatness of the edge face part and accuracy in length and width of the glass substrate can be further enhanced than the glass substrate 10A illustrated in FIG. 1.

Any suitable well-known mechanical polishing treatments such as a brush polishing treatment may be herein employed as the polishing treatment. Alternatively, any suitable well-known chemical polishing treatments such as an etching treatment may be herein employed as the polishing treatment.

Figure 5:
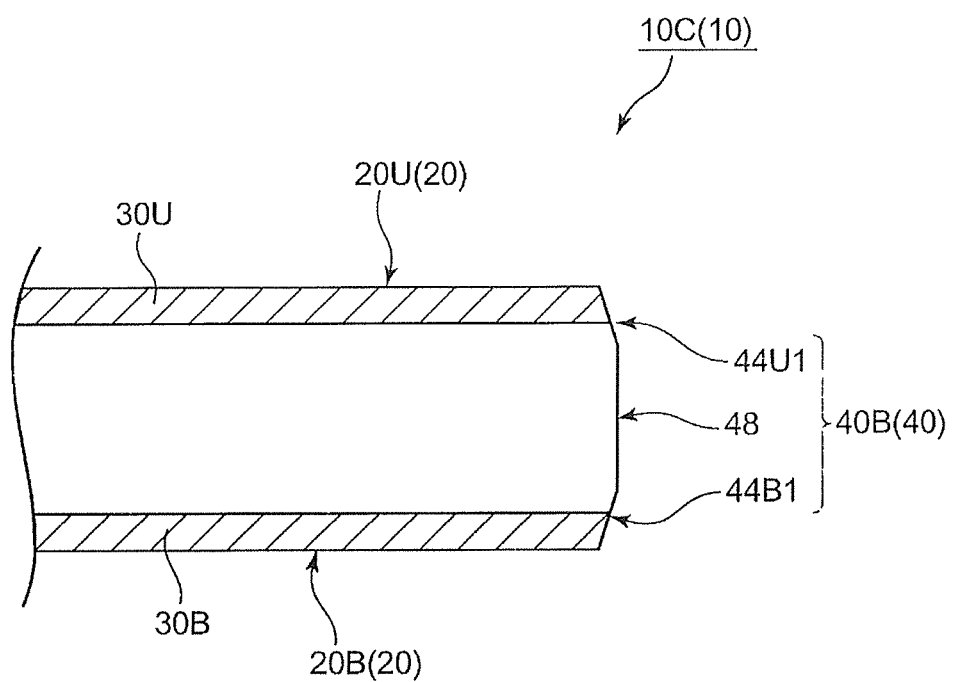
FIG. 5 is a schematic cross-sectional view of yet another example (second example) of the glass substrate according to the exemplary embodiment of the present invention.

FIG. 5 is a schematic cross-sectional view of another example (second example) of the glass substrate according to the present exemplary embodiment. Specifically, FIG. 5 illustrates an aspect of a glass substrate obtained by removing the ridge 42 and its periphery of the glass substrate 10A illustrated in FIG. 1 by means of a polishing treatment and thereby forming a flat surface on a part of the edge face. In FIG. 5, the same reference numerals are assigned to the components having the same shapes as the corresponding components in FIG. 1. In a glass substrate 10C illustrated in FIG. 5, an edge face 40B (40) includes a slope 44U1, a slope 44B1 and a flat surface (polished surface) 48. The slope 44U1 is positioned on the front-face 20U side, whereas the slope 44B1 is positioned on the back-face 20B side. The flat surface 48 is positioned between the slope 44U1 and the slope 44B1. The flat surface 48 is formed by removing the ridge 42 and its periphery by means of a polishing treatment. The flat surface 48 is herein arranged roughly perpendicular to the front and back faces 20U and 20B. Except for the feature, the glass substrate 10C illustrated in FIG. 5 has the same structure as the glass substrate 10A illustrated in FIG. 1. Further, the decoration layer(s) 60 may be disposed on the front face 20U and/or the back face 20B of the glass substrate 10C as exemplified in FIG. 4.

Applications of the glass substrate 10 of the present exemplary embodiment are not particularly limited. Considering the principal faces 20 having superior impact resistance and superior scratch resistance, however, the glass substrate 10 is preferably used for applications requiring impact resistance and/or scratch resistance of the faces. Representatively, exemplary applications include the touch panels and the protective cover glasses (hereinafter simply referred to as "cover glass") for a variety of display panels (liquid crystal display panel, organic EL panel, plasma display panel, etc.).

Figure 6:
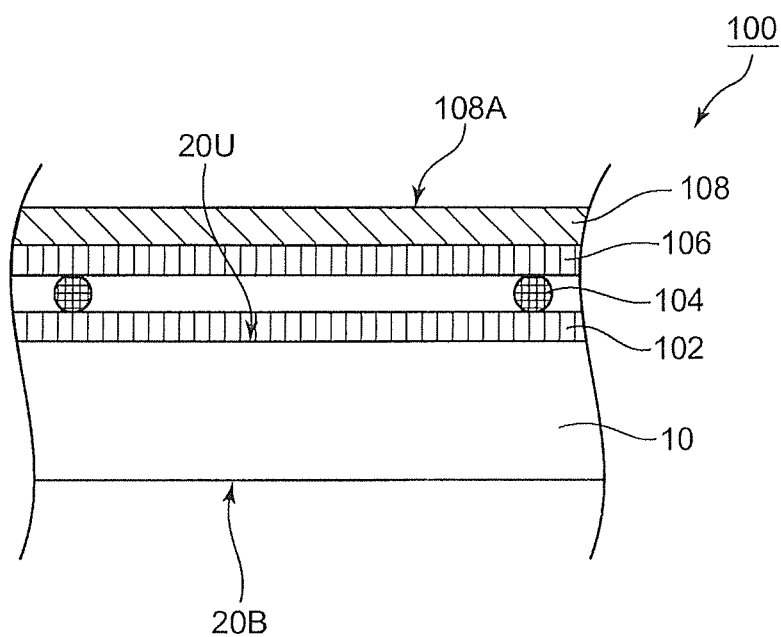
FIG. 6 is a schematic cross-sectional view of an example of a touch panel using the glass substrate according to the exemplary embodiment of the present invention.

FIG. 6 is a schematic cross-sectional view of an exemplary touch panel using a glass substrate of the present exemplary embodiment. It should be noted that specific description of the cross-sectional structure of the glass substrate 10 illustrated in FIG. 6 will be hereinafter omitted. A touch panel 100 illustrated in FIG. 6 includes the glass substrate 10 and a plurality of layers disposed on the front face 20U of the glass substrate 10, including a first transparent conductive film 102, a second transparent conductive film 106 and a resin film layer 108. Specifically, the second transparent conductive film 106 is opposed to the first transparent conductive film 102 through spacers 104. The resin film layer 108 is disposed on the opposite side of the glass substrate 10 through the second transparent conductive film 106. In the touch panel 100, the first transparent conductive film 102 and the second transparent conductive film 106 make contact with each other when a surface 108A of the resin film layer 108 is pressed. Accordingly, electric current flows between the first transparent conductive film 102 and the second transparent conductive film 106. By contrast, conduction between the first transparent conductive film 102 and the second transparent conductive film 106 is blocked when the surface 108A of the resin film layer 108 is released from being pressed. An on/off state of electric current is herein transmitted as input information to a control circuit (not illustrated in the figure) connected to the touch panel 100. In turn, the control circuit transmits display information in accordance with the input information to a display (not illustrated in the figure) disposed on the back face 20B side of the glass substrate 10. A touch panel operation is thus realized.

Figure 7:
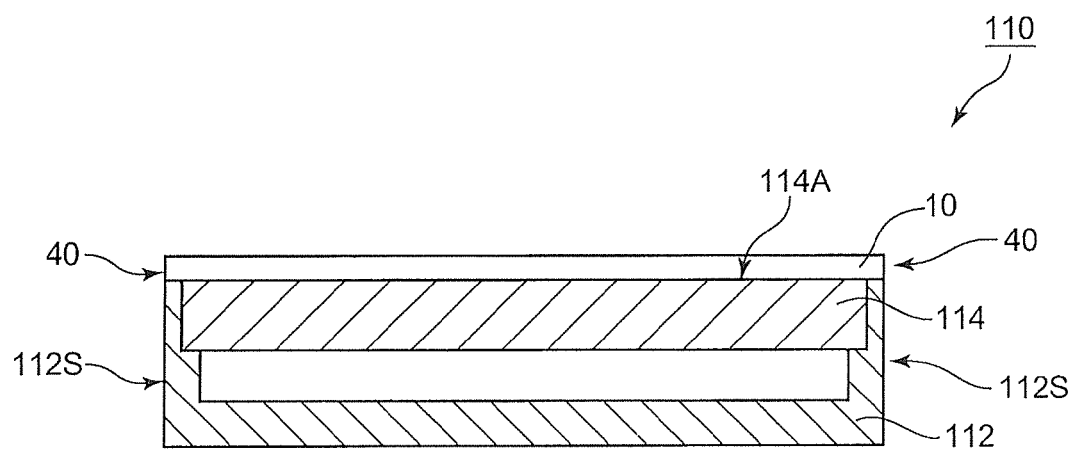
FIG. 7 is a schematic cross-sectional view of an example of an image display unit according to the exemplary embodiment of the present invention.

FIG. 7 is a schematic cross-sectional view of an exemplary image display unit of the present exemplary embodiment. It should be noted that FIG. 7 illustrates main elements of the image display unit without illustrating the other elements. Further, specific description of the cross-sectional structure of the glass substrate 10 of the present exemplary embodiment illustrated in FIG. 7 will be hereinafter omitted. An image display unit 110 illustrated in FIG. 7 includes at least a panel frame 112, an image display panel 114 and a glass substrate 10. Specifically, the image display panel 114 is a LCD (Liquid Crystal Display) panel, for instance, and is held by the panel frame 112. The glass substrate 10 is disposed on an image display surface 114A of the image display panel 114 for roughly entirely covering the image display surface 114A. It should be noted in the example illustrated in FIG. 7 that the image display surface 114A and the glass substrate 10 may be closely contacted to each other. Alternatively, a minute clearance may be produced between the image display surface 114A and the glass substrate 10. Yet alternatively, another layer such as a resin film may be interposed therebetween. Further, the image display unit 110 may be configured to independently function as a single unit. Alternatively, the image display unit 110 may form a part of another electronic device similarly to a display panel part of a portable electronic device such as a mobile phone.

Further, in the example illustrated in FIG. 7, an edge face 40 of the glass substrate 10 is completely exposed to the outside and substantially forms a plane together with a lateral surface 112S of the panel frame 12. However, the glass substrate 10 may be buried together with the image display panel 114 in the panel frame 112 for preventing the edge face 40 from being exposed to the outside. It should be noted that the edge face 40 is often desirably exposed completely to the outside as illustrated in FIG. 7 from a design aspect. Therefore, the edge face 40 is also preferably exposed to the outside for a better design aspect. When the image display unit 110 is herein hit against a floor or a wall, the corner part 50 of the glass substrate 10 is directly exposed to mechanical impact. However, the glass substrate 10 of the present exemplary embodiment has superior impact resistance in the corner part 50. Therefore, the glass substrate 10 has a smaller chance of breakage or damage of a cover glass than the glass substrates 200 and 210 exemplified in FIGS. 2 and 3. Therefore, the glass substrate 10 of the present exemplary embodiment can more flexibly design the appearance of an image display unit with a cover glass even in consideration of impact resistance.

It should be noted that the image display panel 114 normally includes a rectangular image display area on the image display surface 114A. In this case, it is preferable to use the glass substrate 10 of the present exemplary embodiment, having a planar shape roughly matched with the contour of the image display area in the planar direction, as a cover glass disposed on the image display surface 114A of the image display panel 114. The glass substrate 10 is herein preferable because degradation in image quality is prevented in four corners of the screen. The reason for prevention of image quality degradation will be hereinafter explained. First, in each of the glass substrates 200 and 210 exemplified in FIGS. 2 and 3, the compressive stress layer 32/34 has a much greater thickness in the vicinity of the three-surface corner part than in the other part. Further, the compressive stress layer 32/34 has different refractive indices between the three-surface corner part thereof and the other part thereof. In other words, difference in thickness between the vicinity of the three-surface corner part and the other part in the compressive stress layer 32/34 results in difference in polarization and light scattering between the vicinity of the three-surface corner part and the other part in the glass surface. Because of this, vision of an image in four corners of the screen will be different from that in the other part of the screen in using, as a cover glass, one of the glass substrates 200 and 210 with a planar shape roughly matched with the contour of the image display area in the planar direction. In the glass substrate 10 of the present exemplary embodiment, by contrast, the compressive stress layer 20 has roughly the same thickness in the vicinity of the three-surface corner part and in the other part. The aforementioned drawback can be thereby avoided. It should be noted that "a planar shape roughly matched with the contour of the image display area in the planar direction" refers to a planar shape inwardly or outwardly displaced within a range of ±10 mm from an outline forming the contour of the image display area in the planar direction.

Further, a ratio of the size (i.e., square measure) of four corner parts to the size (i.e., square measure) of the entire image display area is increased in proportion to reduction in size of the image display area. In other words, where degradation in image quality is caused in four corner parts, viewer's strange impression on vision of an image in four corner parts becomes greater in proportion to reduction in size of the image display area. In view of the above, the image display area preferably has a size with a diagonal of greater than or equal to 1.5 inches, more preferably, a size with a diagonal of greater than or equal to 2.0 inches. It should be noted that the lower limit of the size of the image display area is not particularly limited. However, the image display area preferably has a size with a diagonal of less than or equal to 5.0 inches for practical purposes.

As a more preferable application aspect of the glass substrate 10 of the present exemplary embodiment, the glass substrate 10 is preferably used as a cover glass for a portable electronic device (especially a mobile phone) at least including an image display panel and a cover glass disposed on the image display surface side of the image display panel. The portable electronic devices, especially the mobile phones, have chances that the corner parts of the cover glass are exposed to mechanical impact due to the application aspect thereof. In addition, such portable electronic devices are required to have diversity in design. According to the glass substrate 10 of the present exemplary embodiment, the both needs can be easily satisfied as described above.

Figure 8:
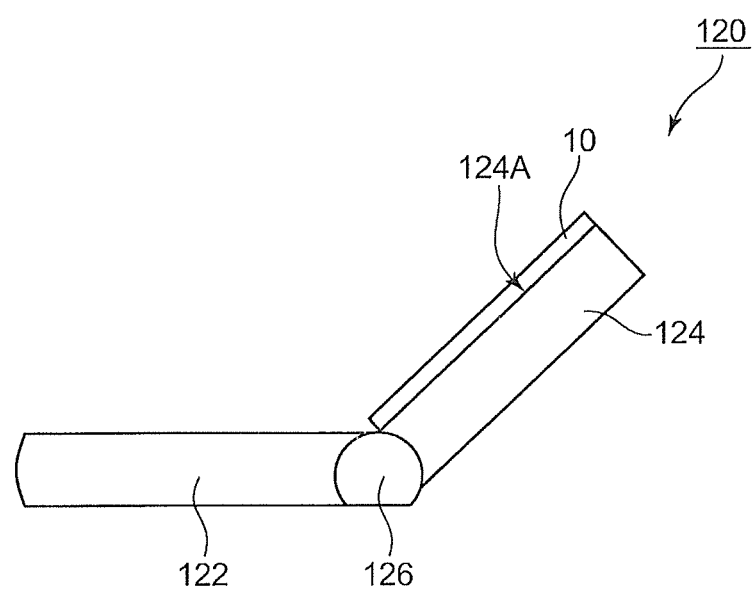
FIG. 8 is side view of an example of a portable electronic device according to the exemplary embodiment of the present invention.

FIG. 8 is a side view of an exemplary portable electronic device of the present exemplary embodiment. Specifically, FIG. 8 illustrates a mobile phone including the glass substrate 10 of the present exemplary embodiment as a cover glass on an image display surface side of an image display panel. A mobile phone 120 illustrated in FIG. 8 includes a main body 122, a display part 124, a hinge part 126 and the glass substrate 10. Specifically, the display part 124 includes the image display panel. The hinge part 126 foldably connects the main body 122 and the display part 124. The glass substrate 10 is disposed on the display part 124 for covering roughly entirety of an image display surface 124A of the display part 124.

Any suitable type of glass material can be herein used as the glass material forming the glass substrate 10 of the present exemplary embodiment as long as the glass material contains ion-exchangeable alkaline metal oxide. However, the following heretofore known glass material is preferably used: (1) aluminosilicate glass containing $SiO_2$ to be used in fabricating a plate glass by means of a down-draw method and at least one selected from the group of alkaline metal oxide including: $Al_2O_3$, $Li_2O$ and $Na_2O$; and (2) soda-lime glass to be used for fabricating a plate glass by means of a float method or the like. When the glass substrate 10 is herein fabricated from a plate glass by means of the down-draw method, scratches are hardly produced on the plate glass surface and the plate glass surface has a surface asperity of nanometer order, compared to the glass substrate 10 fabricated by means of a float method or the like. Therefore, it is advantageous in that a mirror surface polishing step can be omitted for forming the principal faces 20 in fabricating the glass substrate 10 as well as in that production of micro cracks can be inhibited on the principal faces 20 as much as possible.

Form various points of view including practical aspects such as manufacturability, mechanical strength, and chemical durability of the plate glass, the aluminosilicate glass more preferably contains: 62 to 75% by weight of $SiO_2$; 5 to 15% by weight of $Al_2O_3$; 0 to 8% by weight of $Li_2O$; 4 to 16% by weight of $Na_2O$; 0 to 6% by weight of $K_2O$; 0 to 12% by weight of $ZrO_2$; and 0 to 6% by weight of MgO.

Further, the compressive stress layer 20 is an altered layer that a part of alkaline metal originally contained in the glass material forming the glass substrate 10 is substituted by alkaline metal having an ion diameter greater than that of the alkaline metal originally contained in the glass material. When Li is the alkaline metal originally contained in the glass material forming the glass substrate 10, for instance, Li is substituted by Na, K or the like. On the other hand, when Na is the alkaline metal originally contained in the glass substrate forming the glass substrate 10, Na is substituted by K or the like.

(Method of Manufacturing Glass Substrate)

Next, a method of manufacturing the glass substrate 10 of the present exemplary embodiment will be hereinafter explained. First, the glass substrate 10A exemplified in FIG. 1 can be fabricated at least through an ion-exchanging step, an etching-proof layer forming step, a patterning step and a cutting step. In the ion-exchanging step, a plate glass containing at least a type of alkaline metal is ion-exchanged through the contact with molten salt containing at least a type of alkaline metal. In the etching-proof layer forming step, an etching-proof layer is formed on at least either of the faces of the ion-exchanged plate glass. In the patterning step, at least the etching-proof layer is patterned. In the cutting step, the ion-exchanged plate glass is cut in a smaller size through etching of causing the ion-exchanged plate glass face/faces having the patterned etching-proof layer thereon to make contact with etchant. The respective steps will be hereinafter explained in detail.

Ion-Exchanging Step

In the ion-exchanging step, a plate glass containing at least a type of alkaline metal is caused to make contact with molten salt containing at least a type of alkaline metal for executing ion-exchanging. In the ion-exchanging step, the plate glass is normally soaked into the molten salt for ion-exchanging the both faces of the plate glass. The composition and the temperature of the molten salt and the soak time in the molten salt may be arbitrarily set in accordance with a variety of factors such as the glass composition of the plate glass and the thickness of the compressive stress layer 20 disposed as the superficial part of the plate glass. When the glass composition of the plate glass is the aforementioned aluminosilicate glass or soda-lime glass, for instance, the composition and temperature of the molten salt and the soak time in the molten salt, in general, are preferably selected from the following ranges:

(1) Molten salt composition: potassium nitrate or salt mixture of potassium nitrate and sodium nitrate;

(2) Molten salt temperature: 320 to 470 degrees Celsius; and (3) Soak time: 3 to 600 minutes.

Etching-Proof Layer Forming Step

In the etching-proof layer forming step, an etching-proof layer is formed on at least either of the faces of the ion-exchanged plate glass. The etching-proof layer is normally formed on the both faces of the ion-exchanged plate glass. However, when only either of the faces of the plate glass is caused to make contact with etchant in the cutting step, it is only required to form the etching-proof layer on the solution-contacted face of the plate glass. In the following explanation, it is assumed that the etching-proof layers are formed on the both faces of the ion-exchanged plate glass. Any suitable film may be arbitrarily selected as the etching-proof layer as long as the film can be partially patterned and removed in a patterning step but is neither dissolved with nor removed by the etchant to be used in the cutting step. It is preferable to use, as the etching-proof layer, a resist film that is insoluble or hardly soluble at least with respect to hydrofluoric acid solution. In this case, the resist film can be patterned by means of exposure using a photo mask and development using developer in the patterning step, and can be cut using the etchant in the cutting step.

Patterning Step

In the patterning step, at least the etching-proof layer is patterned. The etching-proof layer, covering the entire surface of the ion-exchanged plate glass, is thereby removed except for a region thereof matched with the planar shape of the glass substrate 10 to be finally fabricated. The aforementioned photolithography of executing exposure and development in combination can be representatively used as the method of patterning the etching-proof layer. It should be noted that the patterning step is only required to be executed at least with respect to either of the faces of the ion-exchanged plate glass having the etching-proof layers on the both faces thereof, and may be executed for the both faces of the ion-exchanged plate glass. When the patterning step is executed for the both faces of the ion-exchanged plate glass, the edge face 40A, including the ridge 42 and two slopes 44U and 44B in a cross-sectional view as exemplified in FIG. 1, is formed after execution of the cutting step.

Cutting Step

In the cutting step, the ion-exchanged plate glass is cut in a smaller size by means of etching of causing the face/faces of the ion-exchanged plate glass on which the patterned etching-proof layer is formed to make contact with the etchant. In the etching treatment, the plate glass is normally soaked into the etchant. Any suitable etchant may be used as long as the etchant at least contains hydrofluoric acid. However, the other acids such as hydrochloric acid and/or a variety of additives such as surfactant may be added to the etchant on an as-needed basis.

Figure 9A:
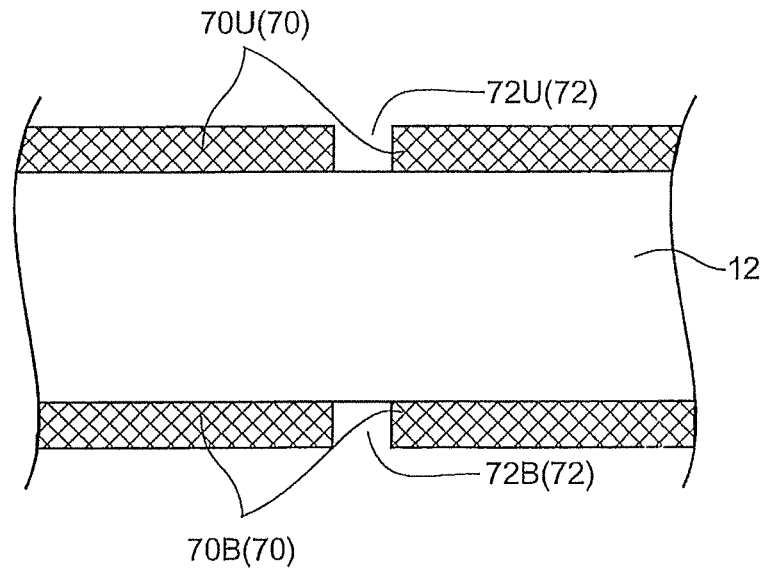
FIG. 9A is a schematic cross-sectional view for explaining an example of a method of manufacturing a glass substrate according to the exemplary embodiment of the present invention, illustrating a cutting-step pre-execution state.
Figure 9B:
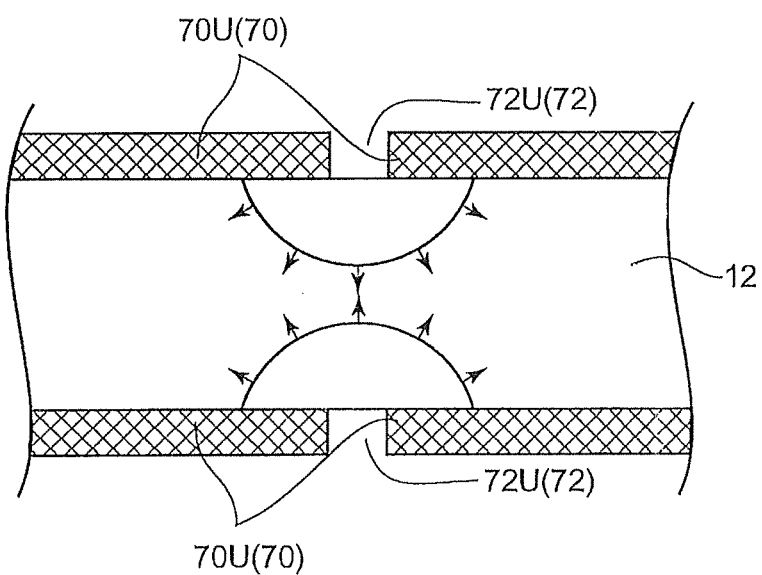
FIG. 9B is a schematic cross-sectional view for explaining an example of a method of manufacturing a glass substrate according to the exemplary embodiment of the present invention, illustrating a cutting-step ongoing state.

FIGS. 9A and 9B are schematic cross-sectional views for explaining an exemplary method of manufacturing a glass substrate of the present exemplary embodiment. Specifically, FIGS. 9A and 9B explain exemplary cutting steps in fabricating the glass substrate 10A illustrated in FIG. 1. More specifically, FIG. 9A is a diagram illustrating a cutting-step pre-execution state. In other words, FIG. 9A illustrates a state that the etching-proof layers, formed on the ion-exchanged plate glass, are patterned. On the other hand, FIG. 9B illustrates a cutting-step ongoing state. It should be noted that FIGS. 9A and 9B omit illustration of the compressive stress layer 20 formed on the plate glass.

In the cutting-step pre-execution state illustrated in FIG. 9A, etching-proof layers 70 (70U and 70B) are formed on the both faces of a plate glass 12. Further, each etching-proof layer 70 (70U/70B) includes at least an opening 72 (72U/72B) formed in the patterning step. The surface of the plate glass 12 is exposed to the outside through the openings 72 (72U and 72B). It should be noted that the position of the opening 72U formed on one face of the plate glass 12 is matched with that of the opening 72B formed on the other face of the plate glass 12 in the planar direction of the plate glass 12. Further, the width of the opening 72U is the same as that of the opening 72B. Yet further, the openings 72 are formed in a strap shape extended from the front side to the rear side in the depth direction of FIG. 9A.

Next, the plate glass 12 of FIG. 9A, having the etching-proof layers 70 with the openings 72 thereon, is soaked into the etchant (not illustrated in FIG. 9A). In this case, the etchant enters the openings 72 and selectively etches a part of the plate glass 12 exposed on the bottom of each opening 70. As depicted with arrows in FIG. 9B, etching proceeds on the both faces of the plate glass 12 from the bottom of each opening 72 in roughly isotropic directions. Therefore, the glass substrate 10A to be obtained through the cutting step includes the edge face 40A formed in a convex curved surface as illustrated in FIG. 1. Further, the etched surface is smoothed in wet etching using the etchant. Therefore, the surface roughness Ra of the edge face 40A can be easily less than or equal to 10 nm in two perpendicular directions. In other words, the edge face 40A can be finished as a mirror surface.

Decoration Layer Forming Step

In fabricating the glass substrate 10B with the decoration layer 60 illustrated in FIG. 4 instead of the glass substrate 10A illustrated in FIG. 1, a decoration layer forming step is executed for forming at least a decoration layer 60 on at least either of the faces of the ion-exchanged plate glass after execution of the ion-exchanging step and before execution of the etching-proof layer forming step. In this case, the etching-proof layer is formed on the surface of the decoration layer 60 in the etching-proof layer forming step.

When only the etching-proof layer is herein patterned in the patterning step, a region of the decoration layer 60 and the plate glass, corresponding to the patterned and removed region of the etching-proof layer, is etched and cut in the cutting step. In this case, the composition, having a feature of eroding both the decoration layer 60 and the plate glass without eroding the etching-proof layer, is selected as the composition of the etchant to be used in the cutting step.

When the etching-proof layer and the decoration layer 60 are simultaneously patterned in the patterning step, on the other hand, a region of the plate glass, corresponding to the patterned and removed region of the etching-proof layer and the decoration layer 60, is etched and cut in the cutting step. In this case, the composition, having a feature of eroding the plate glass without eroding both of the etching-proof layer and the decoration layer 60, is selected as the composition of the etchant to be used in the cutting step.

As a film forming method of the decoration layer 60, any heretofore known film forming methods may be arbitrarily used in accordance with the material forming the decoration layer 60, the thickness of the decoration later 60 and so forth. Exemplary film forming methods include: a variety of printing methods (e.g., screen printing); dipping methods; spray coating methods; sol-gel coating methods; heretofore known liquid phase deposition methods (e.g., plating); vacuum vapor deposition methods; spattering method; and heretofore known vapor deposition methods (e.g., CVD; Chemical Vapor Deposition).

The following steps are executed for fabricating the glass substrate 10 in the aforementioned method of manufacturing a glass substrate according to the present exemplary embodiment. In short, the ion-exchanging step (and optionally the decoration film forming step) is (are) executed for the plate glass 12 formed in a large size, and subsequently, the cutting step is executed for cutting the plate glass 12 in a smaller size. Therefore, the method of manufacturing a glass substrate according to the present exemplary embodiment is superior in: (1) productivity and cost; and (2) accuracy in size of a glass substrate to be fabricated, compared to the methods of manufacturing the glass substrates 200 and 210 exemplified in FIGS. 2 and 3 or the glass substrates 200 and 210 with the decoration layer 60 by executing an ion-exchanging treatment with respect to (and optionally forming a decoration layer on) the plate glass 12 preliminarily cut in the same small size as the glass substrate 10.

(1) The following is the reason that the method of manufacturing a glass substrate of the present exemplary embodiment is superior in productivity and cost. When the plate glass 12 is formed by cutting a large-sized plate glass into pieces, totally a large number of the plate glasses 12 is required to be handled in executing an ion-exchanging treatment or forming a decoration layer, as compared to when the plate glass 12 has the same size as the original large-sized plate glass before cutting. For example, when a large number of the plate glasses 12, formed by cutting the original large-sized plate glass into pieces, is soaked into molten salt in executing an ion-exchanging treatment, the plural small-sized plate glasses 12 are required to be set in a holder for holding the plate glasses 12 in the molten salt. Therefore, work efficiency in setting the plate glasses 12 in the holder is much worse in using the plural small-sized plate glasses 12 than in using a single large-sized plate glass 12.

(2) On the other hand, the following is the reason that the method of manufacturing a glass substrate of the present exemplary embodiment is superior in accuracy in size of a glass substrate to be fabricated. In the method of manufacturing a glass substrate of the present exemplary embodiment, cutting is executed using wet etching after execution of an ion-exchanging treatment with size change of the plate glass 12. Specifically, when an ion-exchanging treatment is executed using the plate glass 12 cut in a smaller size through a cutting treatment using wet etching or scribe-cutting, the cutting treatment is required to be executed by predicting size change caused due to execution of the ion-exchanging treatment in order to obtain a glass substrate with a desired size. However, size change caused due to execution of the ion-exchanging treatment varies. Therefore, an obtained glass substrate tends to vary in size even if no matter how an original glass substrate is accurately cut in the cutting treatment. By contrast, even if any type of size change is caused in the ion-exchanging treatment in the method of manufacturing a glass substrate of the present exemplary embodiment, the size of the glass substrate 10 is determined by the cutting treatment using wet etching to be executed after the ion-exchanging treatment. Therefore, the size of the glass substrate 10 can be quite easily controlled to be a desired size.

Edge Face Polishing Step

It should be noted that the method of manufacturing a glass substrate of the present exemplary embodiment may further includes an edge face polishing step of at least partially polishing a cut surface formed as a result of the cutting step. The cut surface herein refers to an edge face having a convex curved surface formed by means of wet etching (e.g., the edge face 40A exemplified in FIGS. 1 and 4). Through the execution of the edge face polishing step, it is possible to obtain a glass substrate with an edge face that at least a partial region thereof is a flat surface formed by means of a polishing treatment (e.g., the glass substrate 10C exemplified in FIG. 5). Suppose the edge face 40A of the glass substrate 10B illustrated in FIG. 4 is processed to be the edge face 40B illustrated in FIG. 5 by removing the ridge 42 and its periphery by means of polishing, it is possible to prevent abrasion, breakage/damage or peeling due to the polishing treatment on the edge face 40B of the decoration layer 60.

PRACTICAL EXAMPLE

A practical example of the present invention will be hereinafter explained in more detail. However, the present invention is not limited to the following practical example.

Practical Example 1

A plate glass (thickness: 0.5 mm, length×width: 400 mm×320 mm) made of aluminosilicate glass, fabricated by means of a down-draw method, was soaked into molten salt. Accordingly, compressive stress layers 20U and 20B, respectively having a thickness of roughly 40 μm, were formed on the both faces of the plate glass. The glass composition of the plate glass includes 63.5% by weight of $SiO_2$, 8.2% by weight of $Al_2O_3$, 8.0% by weight of $Li_2O$, 10.4% by weight of $Na_2O$ and 11.9% by weight of $ZrO_2$. In executing the ion-exchanging treatment, salt mixture of potassium nitrate and sodium nitrate was used as the molten salt where a mixed ratio by weight percent is set to be "potassium nitrate:sodium nitrate=60:40". Further, the soak time of the plate glass was regulated on an as-needed basis while the temperature of the molten salt is maintained in a range of 320 to 360 degrees Celsius in order to form the compressive stress layers 20U and 20B with the aforementioned thickness.

Next, a hydrofluoric-acid-proof negative resist film with a thickness of 30 μm was formed on the each face of the ion-exchanged plate glass by means of a roll coater. Further, the resist films on the both faces were baked at 150 degrees Celsius for 30 minutes. Next, a patterning treatment of forming openings by partially removing the resist films was executed by exposing the resist films with a photo mask and subsequently developing the resist films with $Na_2CO_3$ solution as a developer.

Next, the plate glass with the patterned resist films was cut by soaking the plate glass into the etchant containing hydrofluoric acid and hydrochloric acid for executing wet etching for the both faces of the plate glass. Subsequently, the resist films were dissolved and removed by means of organic solvent and are further washed. As a result, the glass substrate 10A (length×width: 90 mm×45 mm) with the cross-sectional structure illustrated in FIG. 1 was obtained. The edge face 40A of the obtained glass substrate 10A was observed by a SEM (Scanning Electron Microscope). As a result, it was confirmed that the entire surface was formed in a highly flat shape without totally fording any micro cracks or surface textures peculiar to a cut surface formed by scribe-cutting or a polished surface formed by a polishing treatment. Further, the slope 44U of the edge face 40A was measured by an AFM (Atomic Force Microscope) in a contact mode (a measured area: 5 μm×5 μm). The surface roughness Ra thereof was measured to be roughly 2 nm.

Comparative Example 1

A plate glass, having the same size as the glass substrate 10A fabricated in the practical example 1, was obtained by sequentially executing a formation treatment of resist films, a patterning treatment and a cutting treatment using wet etching in this order with respect to the plate glass used in the practical example 1 without executing an ion-exchanging treatment. Next, the obtained plate glass was ion-exchanged under roughly the same conditions as the practical example 1 for forming compressive stress layers (except for corner parts and their vicinity) with roughly the same thickness as the compressive stress layers of the glass substrate 10A fabricated in the practical example 1. Accordingly, the glass substrate 200 with the cross-sectional structure illustrated in FIG. 2 was obtained.

Comparative Example 2

The plate glass used in the practical example 1 was scribe-cut without being ion-exchanged. Accordingly, a plate glass, having the same size as the glass substrate 10A fabricated in the practical example 1, was obtained. Next, the obtained plate glass was ion-exchanged under roughly the same conditions as the practical example 1 for forming compressive stress layers (except for corner parts and their vicinity) with roughly the same thickness as the compressive stress layers of the glass substrate 10A fabricated in the practical example 1. Accordingly, the glass substrate 210, having the cross-sectional structure illustrated in FIG. 3, was obtained.

<Evaluation>

Impact resistance evaluation and visual evaluation for four corner parts were conducted using the glass substrates obtained in the practical example and the comparative examples. The following Table 1 represents the results.

TABLE 1

|  | Practical Example 1 | Comparative Example 1 | Comparative Example 2 |
| --- | --- | --- | --- |
| Impact Resistance Evaluation | A | B | B |
| Visual Evaluation for Four Corner Parts | A | C | A |

The following is explanation of the evaluation methods and the evaluation criteria for the impact resistance evaluation and the visual evaluation for four corner parts represented in Table 1.

Impact Resistance Evaluation

Drop experiments were conducted for 30 glass substrates and a breakage rate of the glass substrates were evaluated. In the drop experiments, each glass substrate was dropped at a height of 100 cm onto a floor with paved solid tiles while a three-surface corner part of the glass substrate is downwardly directed. The evaluation criteria are set as follows:
A: A breakage rate of less than or equal to 5%;
B: A breakage rate of greater than 5% and less than or equal to 20%; and
C: A breakage rate of greater than 20%.

Visual Evaluation for Four Corner Parts

The glass substrate was disposed on the surface of a LCD monitor for a mobile phone while a cover glass is removed from the LCD monitor. Under the condition, the visual evaluation was conducted by comparing vision of an image in the four corner parts of the glass substrate with vision of the image in the center part of the glass substrate. The evaluation criteria are set as follows:
A: Difference was hardly found between vision in four corner parts and that in the center part;
B: Vision in four corner parts is relatively skew compared to vision in the center part; and
C: Vision in four corner parts is markedly skew compared to vision in the center part.

What is claimed is:

1. A glass substrate of a cover glass for a portable electronic device, the glass substrate comprising:
a front face;
a back face;
an edge face formed by an etching treatment on each of front and back faces, the edge face including first and second regions, the first region having a flat surface formed at a center region of the edge face in a thickness direction of the glass substrate, and the second region having a curved surface with a surface roughness Ra of less than or equal to 10 nm and being disposed at the front and back faces in the thickness direction of the glass substrate; and
a compressive stress layer formed by an ion-exchanging method and disposed on each of the front and back faces, the compressive stress layer having the same thickness both in a planar-directional center part thereof and in a planar-directional end part thereof on each of the front and back faces.

2. The glass substrate of a cover glass for a portable electronic device according to claim 1, wherein the flat surface is formed by a polishing treatment on the center region of the edge face.

3. The glass substrate of a cover glass for a portable electronic device according to claim 1, wherein the flat surface is formed by an etching treatment on the center region of the edge face.

4. The glass substrate of a cover glass for a portable electronic device according to claim 1, wherein the edge face is a mirror surface.

5. The glass substrate of a cover glass for a portable electronic device according to claim 1, wherein at least one selected from the front and back faces are provided with at least a decoration layer.

6. The glass substrate of a cover glass for a portable electronic device according to claim 1, wherein the glass substrate is used for at least one selected from a cover glass for display panel protection and a touch panel.

7. An image display unit for a portable electronic device, comprising:
an image display panel including a rectangular image display area; and
a cover glass for a portable electronic device formed by the glass substrate of a cover glass for a portable electronic device according to claim 1, the cover glass disposed on an image display surface side of the image display panel, the cover glass having a planar shape roughly matched with a planar-directional contour of the image display area.

8. A portable electronic device, comprising:
an image display panel;

a cover glass for a portable electronic device formed by the glass substrate of a cover glass for a portable electronic device according to claim 1, the cover glass disposed on an image display surface side of the image display panel.

9. The portable electronic device according to claim 8, wherein the portable electronic device is a mobile phone.

10. The method of manufacturing a glass substrate of a cover glass for a portable electronic device according to claim 8, the method further comprising:
polishing at least a part of a cut surface formed as a result of the step of cutting the ion-exchanged plate glass into pieces.

11. The glass substrate of a cover glass for a portable electronic device according to claim 1, further comprising a three-surface corner part formed as a boundary among the front or back face, the edge face, and another edge face intersecting with the edge face, the three-surface corner part having a round shape.

12. A glass substrate of a cover glass for a portable electronic device, the glass substrate comprising:
a front face;
a back face;
a compressive stress layer formed by an ion-exchanging method and only disposed on each of front and back faces of the glass substrate; and
an edge face of the glass substrate formed by an etching treatment on each of front and back faces, the edge face having a flat surface, and a convex curved surface having a surface roughness Ra of less than or equal to 10 nm.

13. A glass substrate of a cover glass for a portable electronic device, the glass substrate comprising:
a front face;
a back face;
a compressive stress layer formed by an ion-exchanging method and only disposed on each of front and back faces of the glass substrate; and
an edge face of the glass substrate formed by an etching treatment on each of front and back faces, the edge face including a flat surface formed by a polishing treatment on a partial region of the edge face and a curved surface with a surface roughness Ra of less than or equal to 10 nm.

14. A method of manufacturing a glass substrate of a cover glass for a portable electronic device, the method comprising:
executing an ion-exchanging treatment by causing a plate glass containing at least a type of alkaline metal to make contact with a molten salt containing at least a type of alkaline metal;
forming an etching-proof layer on each of front and back faces of the ion-exchanged plate glass;
patterning the etching-proof layer in such a manner that a part of a surface of the ion-exchanged plate glass is exposed; and
cutting the ion-exchanged plate glass into pieces by performing an etching treatment on the exposed part of the ion-exchanged plate glass faces to make contact with an etchant.

15. The method of manufacturing a glass substrate of a cover glass for a portable electronic device according to claim 14, the method further comprising:
forming at least a decoration later on at least one of the front and back faces of the ion-exchanged plate glass after the step of executing the ion-exchanging treatment and before the step of forming the etching-proof layer.

16. A method of manufacturing a glass substrate of a cover glass for a portable electronic device, the method comprising:
forming an etching-proof layer on each of front and back faces of a plate glass containing at least a type of alkaline metal after executing an ion-exchanging treatment in which the plate glass makes contact with a molten salt containing at least a type of alkaline metal;
patterning the etching-proof layer in such a manner that a part of a surface of the ion-exchanged plate glass is exposed; and
cutting the ion-exchanged plate glass into pieces by performing an etching treatment on the exposed part of the ion-exchanged plate glass faces to make contact with an etchant.

17. The method of manufacturing a glass substrate of a cover glass for a portable electronic device according to claim 16, the method further comprising:
forming at least a decoration later on at least one of the front and back faces of the ion-exchanged plate glass after the step of executing the ion-exchanging treatment and before the step of forming the etching-proof layer.

* * * * *